United States Patent
Kimura et al.

(10) Patent No.: US 10,681,925 B2
(45) Date of Patent: Jun. 16, 2020

(54) GROOVED NOODLES

(71) Applicant: NISSHIN FOODS INC, Tokyo (JP)

(72) Inventors: Ryusuke Kimura, Fujimino (JP); Masafumi Higashi, Fujimino (JP)

(73) Assignee: NISSHIN FOODS INC., Tokyo (JP)

( * ) Notice: Subject to any disclaimer, the term of this patent is extended or adjusted under 35 U.S.C. 154(b) by 184 days.

(21) Appl. No.: 15/760,085

(22) PCT Filed: Sep. 14, 2016

(86) PCT No.: PCT/JP2016/077074
§ 371 (c)(1),
(2) Date: Mar. 14, 2018

(87) PCT Pub. No.: WO2017/047624
PCT Pub. Date: Mar. 23, 2017

(65) Prior Publication Data
US 2018/0249742 A1 Sep. 6, 2018

(30) Foreign Application Priority Data
Sep. 14, 2015 (JP) .................... 2015-180825

(51) Int. Cl.
*A23L 7/109* (2016.01)
(52) U.S. Cl.
CPC ........... *A23L 7/109* (2016.08); *A23V 2002/00* (2013.01)
(58) Field of Classification Search
CPC .................................................... A23L 7/109
See application file for complete search history.

(56) References Cited

U.S. PATENT DOCUMENTS

2012/0135123 A1   5/2012  Kimura et al.

FOREIGN PATENT DOCUMENTS

| AU | B-72817/91 | 10/1991 |
|---|---|---|
| CA | 2038761 A1 | 9/1991 |
| EP | 0450428 A2 | 10/1991 |

(Continued)

*Primary Examiner* — Jenna A Watts
(74) *Attorney, Agent, or Firm* — Muncy, Geissler, Olds & Lowe, P.C.

(57) ABSTRACT

Grooved noodles have three grooves formed along the noodle length direction. The transverse cross section of the noodle length has a substantially circular main outer shape. The grooves are positioned in the transverse cross section of the noodle length at 120° intervals in the circumferential direction, and extend in the same rotation direction relative to the center point of the transverse cross section of the noodle length. Each groove has a pair of mutually facing sides that extend from the opening of the groove toward the deepest part of the groove, a first opening end on the side closer to the center point out among the pair of sides, and a second opening end on the side farther from the center point among of the pair of sides. The acute angle formed in each groove by a straight line passing through the first opening end and the deepest part and a straight line passing through the first opening end and the center point is 12-28°. The area of a center region in each of the three grooves forming a triangle has three straight lines passing through the deepest part and the midpoint between the first opening end and the second opening end has a value of 6-34% relative to the area having the main outer shape when the three grooves are not present. The noodle length occupies 85% or more of the center region.

8 Claims, 5 Drawing Sheets

(56) References Cited

FOREIGN PATENT DOCUMENTS

| | | |
|---|---|---|
| JP | H04211337 A | 8/1992 |
| JP | H10146161 A | 6/1998 |
| JP | 3658477 B2 | 6/2005 |
| JP | 2011004701 | 1/2011 |
| JP | 2012115173 | 6/2012 |
| JP | 5102252 B2 | 12/2012 |
| JP | 5726493 B2 | 6/2015 |
| WO | WO2018025838 A1 | 2/2018 |

θ1=15°

θ1=20°

θ1=25°

θ1=10°

θ1=30°

θ1=35°

θ2=15°

θ2=20°

θ2=25°

θ2=30°

θ2=10°

θ2=35°

GROOVED NOODLES

TECHNICAL FIELD

The present invention relates to grooved noodles and particularly to grooved noodles formed with a plurality of grooves along the longitudinal direction of the noodles.

BACKGROUND ART

Conventionally, there has been proposed a noodle having a groove or slit formed along a longitudinal direction of the noodle with an objective of achieving a shortened cooking time. For example, Patent Literature 1 discloses a noodle having a single wedge-shaped groove with a depth of ½ to ⅘ of a diameter of the noodle having a substantially circular cross section. However, if the wedge-shaped groove reaches the center region in a cross section of the noodle, heat would easily penetrate not only the vicinity of the surface but also the center region in the noodle during cooking, so that, although cooking time of the noodle can be shortened as compared to a noodle without grooves, the noodle would be entirely softened and good texture could not be achieved.

In addition, Patent Literature 2 discloses a noodle formed with a solid center region having a circular cross section and a plurality of grooves each having a width that becomes wider at an innermost part than at an opening part. However, such grooves each having a width that becomes wider at an innermost part than at an opening part would not be sufficiently filled up but remain upon completion of cooking of the noodle, so that the noodle would have a different texture from that of a noodle without grooves and could not be improved in texture as a noodle without grooves.

Accordingly, it was difficult for the noodle disclosed in Patent Literature 1 or 2 to achieve "good texture (al dente) having a half-boiled core portion" that is pleasant to the taste as required of spaghetti, for example.

As a measure to cope with it, in an attempt to provide good texture (al dente) having a half-boiled core portion, Patent Literatures 3 and 4 each propose a grooved noodle formed with a plurality of grooves each of which has a cross sectional shape extending as spirally curving from a center region having a circular cross section to the surface of the noodle.

CITATION LIST

Patent Literature

Patent Literature 1: JP 3658477 B
Patent Literature 2: JPH 4-211337 A
Patent Literature 3: JP 5102252 B
Patent Literature 4: JP 5726493 B

SUMMARY OF INVENTION

Technical Problems

Using the grooves exemplified in Patent Literatures 3 and 4, a noodle could achieve reduction in cooking time while the al dente texture would be ensured, but the texture thereof was not sufficiently balanced between the center region and the vicinity of the surface of the noodle.

The present invention is made to overcome the above problem of the prior art and has an object of providing grooved noodles which can achieve reduction in cooking time while the texture of the noodles is well balanced between the center region and the vicinity of the surface thereof.

Solution to Problems

Grooved noodles according to the present invention is formed with three grooves along a longitudinal direction of the noodles and having a substantially circular configuration in cross section, wherein the three grooves are arranged at intervals of 120° along a circumferential direction of the noodles and extend in a same rotational direction with respect to a center point in a cross section of the noodles, wherein each of the grooves includes a pair of sides opposing to each other and extending from an opening part of the groove toward an innermost part of the groove, a first opening end part located on one side of the pair of sides closer to the center point, and a second opening end part located on another side of the pair of sides farther from the center point, wherein an acute angle formed between a straight line passing through the first opening end part and the innermost part and another straight line passing through the first opening end part and the center point in each of the grooves is 12° to 28°, wherein a center region defined in a triangle formed by three straight lines each passing through the innermost part and a middle point between the first opening end part and the second opening end part of a relevant groove has an area of 6% to 34% of a hypothetical area of the configuration when it is assumed that the three grooves are not provided, and wherein the noodles accounts for at least 85% of the center region.

In addition, grooved noodles according to the present invention may be formed with four grooves along a longitudinal direction of the noodles and having a substantially circular configuration in cross section, wherein the four grooves are arranged at intervals of 90° along a circumferential direction of the noodles and extend in a same rotational direction with respect to a center point in a cross section of the noodles, wherein each of the grooves includes a pair of sides opposing to each other and extending from an opening part of the groove toward an innermost part of the groove, a first opening end part located on one side of the pair of sides closer to the center point, and a second opening end part located on another side of the pair of sides farther from the center point, wherein an acute angle formed between a straight line passing through the first opening end part and the innermost part and another straight line passing through the first opening end part and the center point in each of the grooves is 12° to 33°, wherein a center region defined in a quadrilateral formed by four straight lines each passing through the innermost part and a middle point between the first opening end part and the second opening end part of a relevant groove has an area of 4% to 35% of a hypothetical area of the configuration when it is assumed that the four grooves are not provided, and wherein the noodles accounts for at least 85% of the center region.

Preferably, the three grooves or the four grooves each have a depth of 20% to 60% of a noodle diameter in cross section.

Preferably, a part of the noodles situated between adjacent grooves and having a smallest thickness has a thickness of 20% to 60% of a noodle diameter in cross section.

Advantageous Effects of Invention

According to the present invention, since an acute angle formed between a straight line passing through the first opening end part and the innermost part and another straight line passing through the first opening end part and the center point is 12° to 28° in each of the grooves, a center region defined in a triangle formed by three straight lines each passing through a middle point between the first opening end part and the second opening end part and the innermost part of a relevant groove has an area of a value of 6% to 34% with respect to a hypothetical area of the configuration when the three grooves are not provided, and the noodles accounts for at least 85% of the center region, reduction in cooking time of the noodles can be achieved while the texture of the noodles is well balanced between the center region and the vicinity of the surface thereof.

DESCRIPTION OF EMBODIMENTS

Embodiments of the present invention are described below based on the appended drawings.

Embodiment 1

Figure 1:
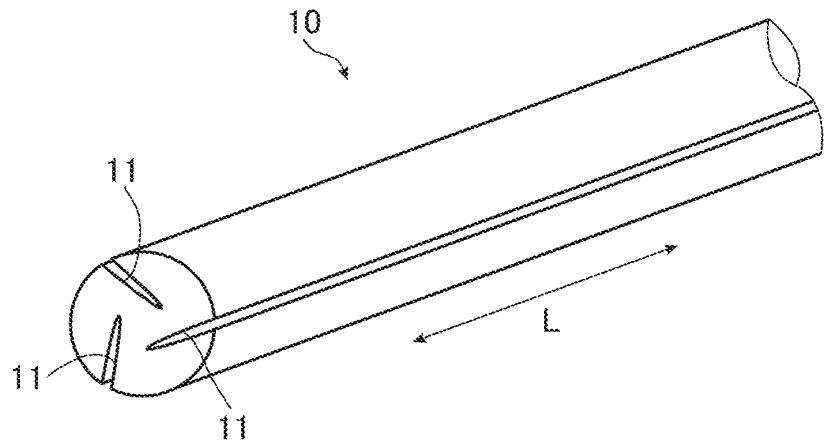
FIG. 1 is a perspective view of a grooved noodle according to Embodiment 1 of the present invention.

FIG. 1 illustrates a grooved noodle 10 according to Embodiment 1 of the present invention. The noodle 10 is consisted of a dried spaghetti noodle elongated in a longitudinal direction L of the noodle. At an outer periphery of the noodle 10, three grooves 11 are formed along the longitudinal direction L.

Figure 2:
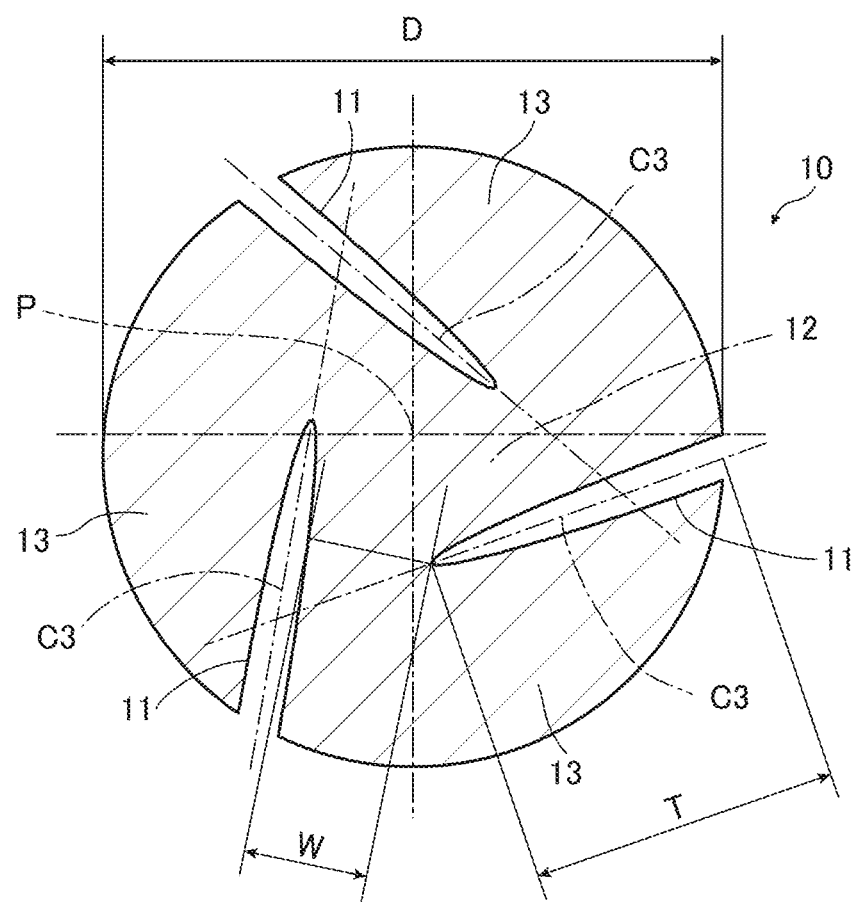
FIG. 2 is a cross-sectional view illustrating the grooved noodle according to Embodiment 1.

As illustrated in FIG. 2, the noodle has a substantially circular configuration in cross section with a diameter D. The three grooves 11 are arranged at intervals of 120° along the circumferential direction of the noodle, i.e., arranged so as to divide the noodle into three in the circumferential direction, and extend in a same rotational direction with respect to a center point P of the noodle.

Figure 3:
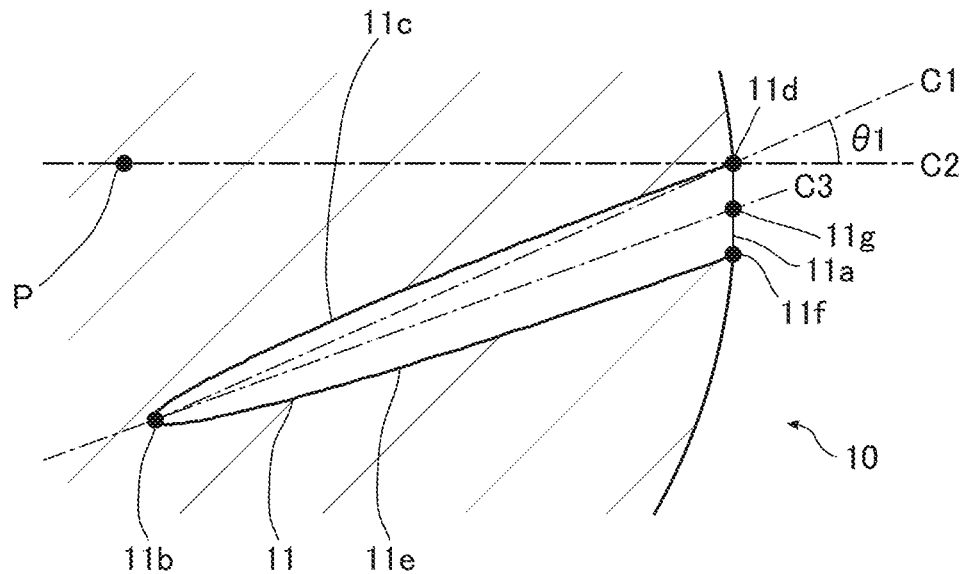
FIG. 3 is an enlarged partial cross-sectional view of the grooved noodle according to Embodiment 1.

FIG. 3 is an enlarged partial cross-sectional view of the groove 11 formed in the noodle 10. Since the groove 11 is formed in the noodle 10, an opening part 11a is provided at the surface of the noodle, and a pair of sides opposing to each other extend as gently curving from the opening part 11a toward an innermost part 11b of the groove 11. At an intersection point between one side 11c, of the pair of sides, closer to the center point P of the noodle and the opening part 11a, a first opening end part 11d is located, while a second opening end part 11f is located at another intersection point between the other side 11e farther from the center point P of the noodle and the opening part 11a.

Here, it is assumed that a first straight line C1 passes through the first opening end part 11d located on the surface of the noodle and the innermost part 11b of the groove 11. It is also assumed that a second straight line C2 passes through the first opening end part 11d and the center point P, i.e., the noodle diameter D in cross section passes through the first opening end part 11d. The first straight line C1 and the second straight line C2 form an acute angle θ1, and the acute angle θ1 is set to fall within a range of 12° to 28°. In FIG. 2, the three grooves 11 each have the acute angle θ1 of a same value.

Furthermore, it is assumed that a middle point 11g between the first opening end part 11d and the second opening end part 11f on the surface of the noodle exists, and that a third straight line C3 passes through the middle point 11g and the innermost part 11b of the groove 11. As illustrated in FIG. 2, the third straight line C3 runs in each of the three grooves 11, and a triangular region is formed by the three third straight lines C3 and is called a center region 12.

The center region 12 is set such that an area thereof accounts for 6% to 34% of a hypothetical area of the noodle configuration when it is assumed that the three grooves 11 are not provided. While part of the three grooves 11 exists within the center region 12, the solid part of the noodle without the grooves accounts for at least 85% of the center region 12. Even if the area of the center region 12 is set to fall within a predetermined range, a degree of water and heat penetration into the noodle upon entrance of hot water into the grooves may vary depending on the shape of the grooves. However, by setting the solid part of the noodle within the center region 12 to account for at least 85% of the center region 12, the noodle can be cooked with texture that is well balanced between the center region and the vicinity of the surface.

Outside of the triangular center region 12, formed are three outer regions 13 separated from one another by the three third straight lines C3 and the three grooves 11. By adjusting the acute angle θ1 formed between the first straight line C1 and the second straight line C2 at each of the grooves 11 to fall within the range of 12° to 28°, the areas of the center region 12 and the respective outer regions 13 can be changed.

Although the size of the noodle 10 is not specifically limited, the noodle diameter D may be set to, for example, 1.8 mm to 2.8 mm, and the length of the noodle to, for example, 250 mm or 165 mm.

The grooved noodle 10 configured as above can be produced by extruding a noodle material using a die formed with through-holes corresponding in cross section to the noodle illustrated in FIG. 2, followed by drying.

When the noodle 10 is placed in a high-temperature water for cooking, water and heat penetrate the noodle through the outer peripheral surface of the noodle. In the process, high-temperature water also enters the three grooves 11, and thus water and heat infiltrate into the noodle through not only the outer peripheral surface of the noodle but the inner walls of the three grooves 11. Accordingly, water and heat readily penetrate into the outer regions 13 located in the vicinity of the surface of the noodle in cross section. On the other hand, while water and heat penetrate the center region 12 from part of the three grooves 11, the center region 12 is located interiorly to the three outer regions 13 and therefore not so much affected from the outer peripheral surface of the noodle that water and heat hardly penetrate into the center region 12.

As the area of the center region 12 decreases, the proportion of the solid part of the noodle within the center region 12 also decreases, leading the center region 12 to be more easily affected by water and heat. In other words, by adjusting the proportion of the solid part of the noodle through alteration of the area of the center region 12, ease of water and heat penetration into the center region 12 can be adjusted.

As described above, the areas of the center region 12 and the outer regions 13 can be altered by adjusting the acute angle θ1 at the three grooves 11, so that a degree of cooking of the center region 12 upon completion of cooking of the outer regions 13 can be adjusted.

Accordingly, when the acute angle θ1 at the three grooves 11 is set to fall within the range of 12° to 28° in advance, the center region 12 can have a half-boiled part when the outer regions 13 located outside the center region 12 have been appropriately cooked.

In this manner, through adjustment of the acute angle θ1 at the three grooves 11, good texture (al dente) of the noodle having a half-boiled part at its center can be achieved in a reduced time, and, in addition, excellent texture that is well balanced between the center region and the vicinity of the surface can be also achieved. Such good texture can be obtained even by cooking with a microwave oven in a short time, for example.

In addition, the noodle 10 absorbs water to swell when cooked in a high-temperature water, whereby the three grooves 11 are filled up so that the noodle forms a substantially circular configuration in cross section. Accordingly, the noodle can obtain similar appearance and texture to those of a noodle with no groove.

Since the center region 12 absorbs water and heat through part of the three grooves 11 as described above, when the depth of the three grooves 11 in the cross section of the noodle varies, ease of water and heat penetration into the center region 12 changes. In order to obtain texture that is well balanced between the center region and the vicinity of the surface in the noodle, the three grooves 11 preferably have a depth T of 20% to 60% of the noodle diameter D.

In addition, high-temperature water enters the three grooves 11, from which water and heat penetrate into the solid part of the noodle situated between adjacent grooves 11. Hence, when the thickness of the solid part of the noodle situated between adjacent grooves 11 varies, a degree of cooking of the noodle 10 as well as the texture thereof also change. Accordingly, the thinnest part of the noodle situated between adjacent grooves 11 preferably has a thickness W of 20% to 60% of the noodle diameter D.

Moreover, while the acute angle θ1 is set to have a same value at all of the three grooves 11 illustrated in FIG. 2, the present invention is not limited thereto, and the angle θ1 may be set to have a different value among the respective grooves 11 within the range of 12° to 28°.

While the grooves 11 illustrated in FIG. 2 each have the pair of sides in cross section that gently curve toward the innermost part 11a, the present invention is not limited thereto, and the grooves 11 may have linear sides. In addition, while the innermost part 11a in the drawing has a rounded shape, the present invention is not limited thereto, and the innermost part 11a may have a pointed shape.

Embodiment 2

Figure 4:
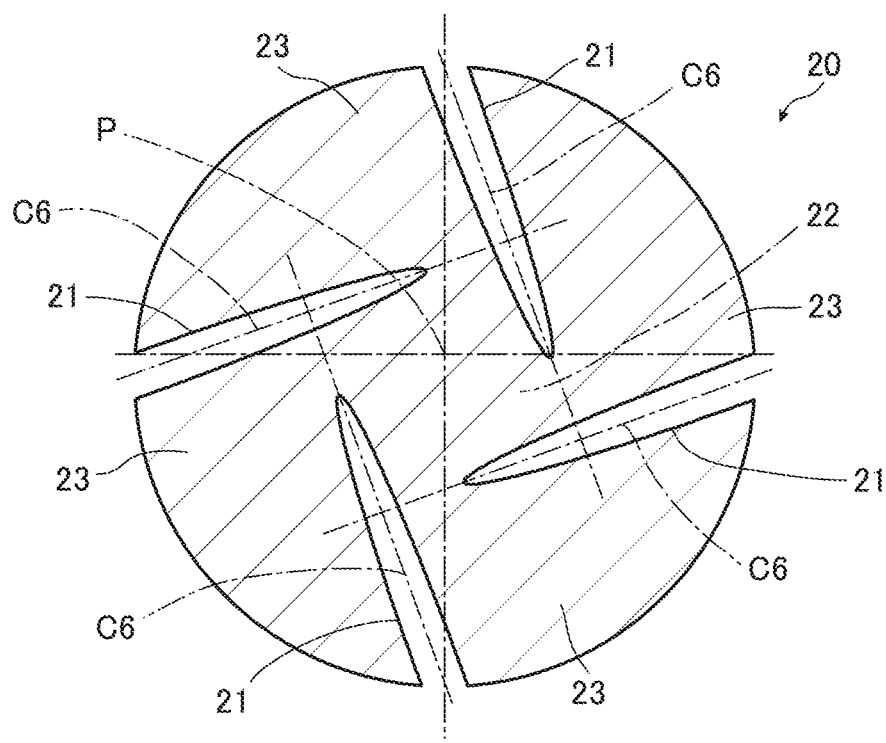
FIG. 4 is a cross-sectional view illustrating a grooved noodle according to Embodiment 2.

FIG. 4 illustrates a cross section of a grooved noodle 20 according to Embodiment 2. While the grooved noodle 10 according to Embodiment 1 illustrated in FIG. 2 has the three grooves 11, the grooved noodle 20 according to Embodiment 2 has four grooves 21 formed along the longitudinal direction L of the noodle.

The noodle has a substantially circular configuration in cross section with the diameter D as in Embodiment 1. The four grooves 21 are arranged at intervals of 90° along the circumferential direction of the noodle, that is, arranged so as to divide the noodle into four in the circumferential direction, and extend in a same rotational direction with respect to the center point P of the noodle.

Figure 5:
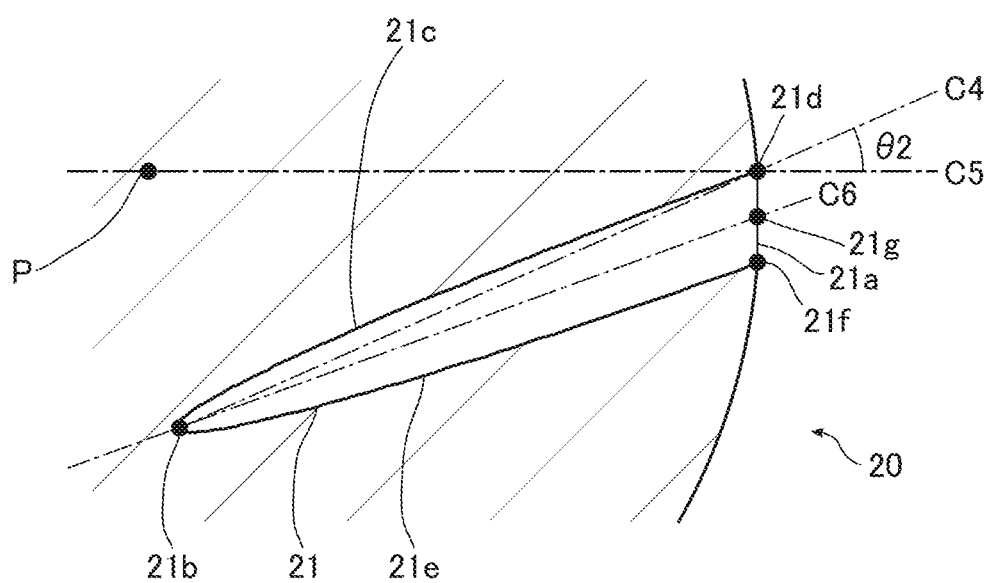
FIG. 5 is an enlarged partial cross-sectional view of the grooved noodle according to Embodiment 2.

FIG. 5 is an enlarged partial cross-sectional view of the groove 21 formed in the noodle 20. An opening part 21a is provided at the surface of the noodle, and a pair of sides extend as gently curving from the opening part 21a toward an innermost part 21b. At an intersection point between one side 21c, of the pair of sides, closer to the center point P of the noodle and the opening part 21a, a first opening end part 21d is located, while a second opening end part 21f is located at another intersection point between the other side 21e farther from the center point P of the noodle and the opening part 21a.

Here, it is assumed that a fourth straight line C4 passes through the first opening end part 21d located on the surface of the noodle and the innermost part 21b of the groove 21. It is also assumed that a fifth straight line C5 passes through the first opening end part 21d and the center point P. The fourth straight line C4 and the fifth straight line C5 form an acute angle θ2, and the acute angle θ2 is set to fall within a range of 12° to 33°. In FIG. 4, the four grooves 21 all have the acute angle θ2 of a same value.

Furthermore, it is assumed that a middle point 21g between the first opening end part 21d and the second opening end part 21f on the surface of the noodle exists, and that a sixth straight line C6 passes through the middle point 21g and the innermost part 21b of the groove 21. As illustrated in FIG. 4, the sixth straight line C6 runs in each of the four grooves 21, and a quadrilateral region is formed by the four sixth straight lines C6 and is called a center region 22.

The center region 22 is set such that an area thereof accounts for 4% to 35% of a hypothetical area of the noodle configuration when it is assumed that the four grooves 21 are not provided. While part of the four grooves 21 exists within the center region 22, the solid part of the noodle without the grooves accounts for at least 85% of the center region 22.

Outside of the quadrilateral center region 22, formed are four outer regions 23 separated from one another by the four sixth straight lines C6 and the four grooves 21.

As with Embodiment 1, by adjusting the acute angle θ2 at the four grooves 21 within the range of 12 to 33°, the areas of the center region 22 and the outer regions 23 can be altered.

By adjusting the angle θ2 at the four grooves 21, the grooved noodle 20 can also be cooked in a reduced time and can obtain good texture having a half-boiled part at its center and, in addition, excellent texture that is well balanced between the center region and the vicinity of the surface.

EXAMPLES

Such grooved noodles each having three grooves as in Embodiment 1 were produced, with angles and sizes of the respective parts being varied.

Example 1

Dough was obtained by mixing 26 parts by weight of water with 100 parts by weight of durum semolina and kneading the resulting mixture. A die having through-holes corresponding to the cross sectional shape of the noodle with three grooves as illustrated in FIG. 2 was attached to a pasta machine, from which the kneaded dough was extruded under a pressure-reduced condition of −600 mmHg, and then the shaped dough was dried by a conventional method to thereby produce a dried spaghetti noodle.

Respective sizes illustrated in FIGS. 2 and 3 were specified as follows: noodle diameter D in cross section=2 mm; acute angle θ1=12°; area proportion R1 of center region 12 to noodle configuration=6.4%; and depth T of three grooves 11 with respect to diameter D=50%.

Example 2

Figure 6A:
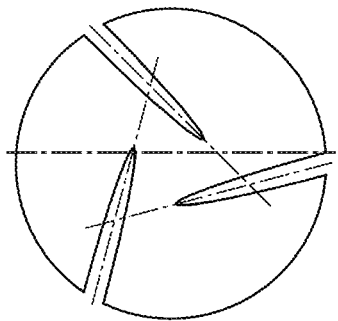
FIGS. 6A to 6F are cross-sectional views illustrating spaghetti noodles produced in Examples 2 to 4 and Comparative Examples 1 to 3, respectively.

FIG. 6A illustrates a cross section of a dried spaghetti noodle according to Example 2. For simplicity, hatching was omitted in the drawing. Except for the changes to acute angle θ1=15° and area proportion R1 of center region 12 to noodle configuration=9.7%, the dried spaghetti noodle was produced in the same manner as that of Example 1.

Example 3

Figure 6B:
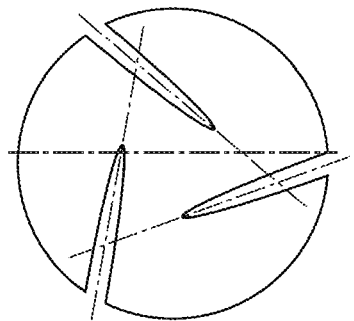

Except for the changes to acute angle θ1=20° and area proportion R1 of center region 12 to noodle configuration=17.4% in conformity with the cross section illustrated in FIG. 6B, a dried spaghetti noodle was produced in the same manner as that of Example 1.

Example 4

Figure 6C:
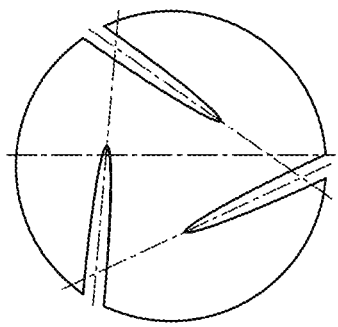

Except for the changes to acute angle θ1=25° and area proportion R1 of center region 12 to noodle configuration=26.9% in conformity with the cross section illustrated in FIG. 6C, a dried spaghetti noodle was produced in the same manner as that of Example 1.

Example 5

Although not illustrated in FIG. 6, except for the changes to acute angle θ1=28° and area proportion R1 of center region 12 to noodle configuration=33.2%, a dried spaghetti noodle was produced in the same manner as that of Example 1.

Comparative Example 1

Figure 6D:
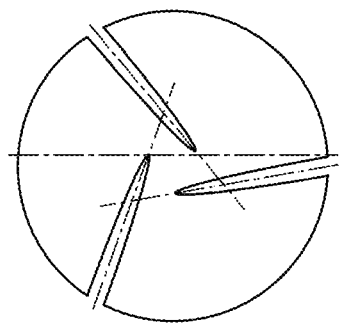

Except for the changes to acute angle θ1=10° and area proportion R1 of center region 12 to noodle configuration=4.4% in conformity with the cross section illustrated in FIG. 6D, a dried spaghetti noodle was produced in the same manner as that of Example 1.

Comparative Example 2

Figure 6E:
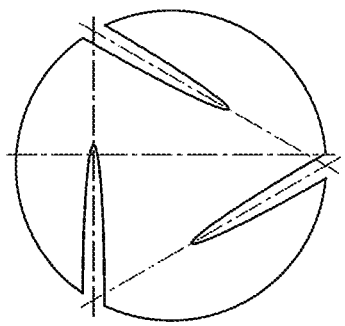

Except for the changes to acute angle θ1=30° and area proportion R1 of center region 12 to noodle configuration=38.1% in conformity with the cross section illustrated in FIG. 6E, a dried spaghetti noodle was produced in the same manner as that of Example 1.

Comparative Example 3

Figure 6F:
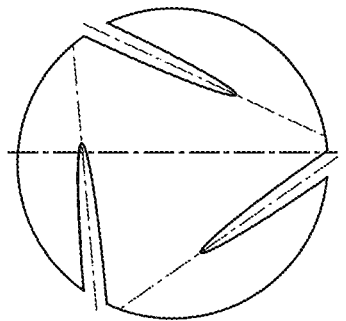

Except for the changes to acute angle θ1=35° and area proportion R1 of center region 12 to noodle configuration=49.9% in conformity with the cross section illustrated in FIG. 6F, a dried spaghetti noodle was produced in the same manner as that of Example 1.

The dried spaghetti noodles produced as described above were boiled in boiling water for three minutes for cooking. Each of the boiled spaghetti noodles was evaluated for texture based on the evaluation criteria shown in Table 1 by ten persons, and an average point of the evaluation results was obtained in the texture evaluation test.

According to the evaluation criteria of Table 1, good texture of a spaghetti noodle that is well balanced texture between the outer regions 13 and the center region 12 illustrated in FIG. 3 scores a high point, whereas poor texture of a spaghetti noodle that is unbalanced between the outer regions 13 and the center region 12 scores a low point.

TABLE 1

| Point | Texture of spaghetti noodle |
| --- | --- |
| 5 | Excellent texture, with soft outer regions and firm center region being very well balanced |
| 4 | Good texture, with soft outer regions and firm center region being well balanced |
| 3 | Texture is not well balanced between outer regions and center region |
| 2 | Inferior texture, with outer regions and center region being unbalanaced in texture |
| 1 | Poor texture, with outer regions and center region being badly balanced in texture |

The spaghetti noodles produced in Examples 1 to 5 and Comparative Examples 1 to 3 were evaluated for their texture based on the evaluation criteria shown in Table 1 by ten persons, and an average point of the evaluation results was obtained. The result thereof is shown in Table 2.

TABLE 2

| | Example 1 | Example 2 | Example 3 | Example 4 | Example 5 | Comparative Example 1 | Comparative Example 2 | Comparative Example 3 |
| --- | --- | --- | --- | --- | --- | --- | --- | --- |
| Noodle diameter D (mm) | 2 | 2 | 2 | 2 | 2 | 2 | 2 | 2 |
| Number of grooves | 3 | 3 | 3 | 3 | 3 | 3 | 3 | 3 |
| Acute angle θ1 (°) | 12 | 15 | 20 | 25 | 28 | 10 | 30 | 35 |
| Area proportion R1 of center region 12 to noodle configuration (%) | 6.4 | 9.7 | 17.4 | 26.9 | 33.2 | 4.4 | 38.1 | 49.9 |
| Proportion R2 of noodle in center region 12 (%) | 92 | 91 | 90 | 90 | 90 | 93 | 90 | 90 |

TABLE 2-continued

|  | Example 1 | Example 2 | Example 3 | Example 4 | Example 5 | Comparative Example 1 | Comparative Example 2 | Comparative Example 3 |
|---|---|---|---|---|---|---|---|---|
| Depth T of three grooves with respect to noodle diamter D (%) | 50 | 50 | 50 | 50 | 50 | 50 | 50 | 50 |
| Average point of evaluation results | 3.8 | 4.1 | 4.5 | 4.2 | 3.9 | 2.3 | 2.6 | 2.0 |

Every average point of the evaluation results of the spaghetti noodles of Examples 1 to 5 was around 4. On the contrary, every average point of the evaluation results of the spaghetti noodles of Comparative Examples 1 to 3 was lower than 3.

In Examples 1 to 5, it was revealed that when the outer regions 13 located outside the center region 12 were appropriately cooked, a suitable half-boiled part remained at the center region 12, and that texture was well balanced between the outer regions 13 and the center region 12, resulting in good texture of the spaghetti noodles.

Meanwhile, in Comparative Example 1, the area proportion R1 of the center region 12 to the noodle configuration was 4.4%, i.e., the area of the center region 12 was smallest in Table 2; it is assumed that too much heat was therefore transmitted to the center region 12 which turned to be too soft in texture, and the texture balance between the outer regions 13 and the center region 12 was impaired. In Comparative Examples 2 and 3, the center region 12 had a relatively large area with the proportion R1 of not smaller than 38% as shown in Table 2, but the area of the outer regions 13 was small; it is assumed that too much heat was therefore transmitted to the outer regions 13 which turned to be too soft in texture, and the texture balance between the outer regions 13 and the center region 12 was impaired.

Table 2 shows that, when the acute angle θ1 and the area proportion R1 of the center region 12 to the noodle configuration are set to 12° to 28° and 6% to 34%, respectively, a spaghetti noodle having good texture can be obtained, with the texture being well balanced between the outer regions 13 and the center region 12.

Every spaghetti noodle produced in Examples 1 to 5 and Comparative Examples 1 to 3 had the proportion R2 of the noodle within the center region 12 of not smaller than 85%; the proportion of the solid noodle part with respect to the center region 12 was never insufficient.

Next, such grooved noodles each having four grooves as in Embodiment 2 were produced, with angles and sizes of the respective parts being varied.

Example 6

A die having through-holes corresponding to the cross sectional shape of the noodle with four grooves as illustrated in FIG. 4 was used, and a dried spaghetti noodle was produced in the same manner as that of Example 1, except for the changes to acute angle θ2=12° and area proportion R1 of center region 22 to noodle configuration=4.9%.

Example 7

Figure 7A:
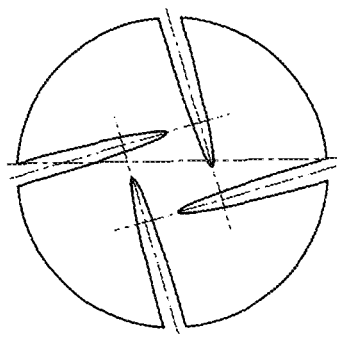
FIGS. 7A to 7F are cross-sectional views illustrating spaghetti noodles produced in Examples 7 to 10 and Comparative Examples 4 and 5, respectively.

FIG. 7A illustrates a cross section of a dried spaghetti noodle according to Example 7. A dried spaghetti noodle was produced in the same manner as that of Example 6, except for the changes to acute angle θ2=15° and area proportion R1 of center region 22 to noodle configuration=7.6%.

Example 8

Figure 7B:
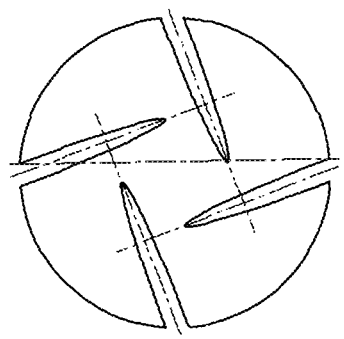

Except for the changes to acute angle θ2=20° and area proportion R1 of center region 22 to noodle configuration=13.5% in conformity with the cross section illustrated in FIG. 7B, a dried spaghetti noodle was produced in the same manner as that of Example 6.

Example 9

Figure 7C:
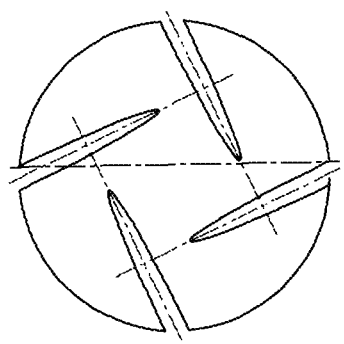

Except for the changes to acute angle θ2=25° and area proportion R1 of center region 22 to noodle configuration=20.5% in conformity with the cross section illustrated in FIG. 7C, a dried spaghetti noodle was produced in the same manner as that of Example 6.

Example 10

Figure 7D:
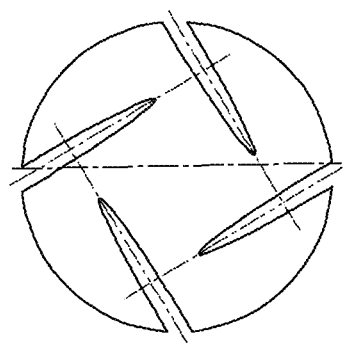

Except for the changes to acute angle θ2=30° and area proportion R1 of center region 22 to noodle configuration=29.2% in conformity with the cross section illustrated in FIG. 7D, a dried spaghetti noodle was produced in the same manner as that of Example 6.

Example 11

Although not illustrated in FIG. 7, except for the changes to acute angle θ2=33° and area proportion R1 of center region 22 to noodle configuration=34.5%, a dried spaghetti noodle was produced in the same manner as that of Example 6.

Comparative Example 4

Figure 7E:
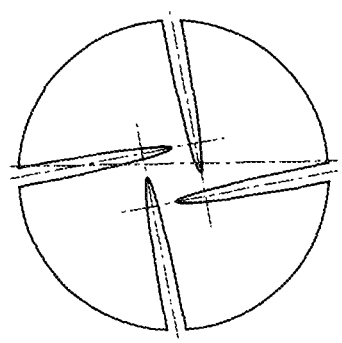

Except for the changes to acute angle θ2=10° and area proportion R1 of center region 22 to noodle configuration=3.4% in conformity with the cross section illustrated in FIG. 7E, a dried spaghetti noodle was produced in the same manner as that of Example 6.

Comparative Example 5

Figure 7F:
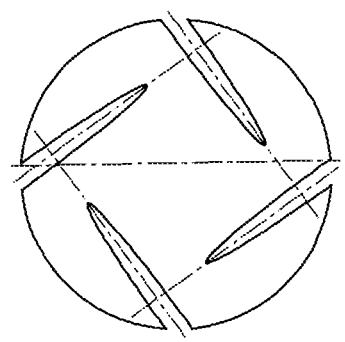

Except for the changes to acute angle θ2=35° and area proportion R1 of center region 22 to noodle configuration=38.3% in conformity with the cross section illustrated in FIG. 7F, a dried spaghetti noodle was produced in the same manner as that of Example 6.

The spaghetti noodles produced in Examples 6 to 11 and Comparative Examples 4 and 5 were evaluated for their texture based on the evaluation criteria shown in Table 1 by ten persons, and an average point of the evaluation results was obtained. The result thereof is shown in Table 3.

TABLE 3

|  | Example 6 | Example 7 | Example 8 | Example 9 | Example 10 | Example 11 | Comparative Example 4 | Comparative Example 5 |
|---|---|---|---|---|---|---|---|---|
| Noodle diameter D (mm) | 2 | 2 | 2 | 2 | 2 | 2 | 2 | 2 |
| Number of grooves | 4 | 4 | 4 | 4 | 4 | 4 | 4 | 4 |
| Acute angle θ2 (°) | 12 | 15 | 20 | 25 | 30 | 33 | 10 | 35 |
| Area proportion R1 of center region 22 to noodle configuration (%) | 4.9 | 7.6 | 13.5 | 20.5 | 29.2 | 34.5 | 3.4 | 38.3 |
| Proportion R2 of noodle in center region 22 (%) | 92 | 91 | 90 | 90 | 90 | 90 | 93 | 90 |
| Depth T of four grooves with respect to noodle diamter D (%) | 50 | 50 | 50 | 50 | 50 | 50 | 50 | 50 |
| Average point of evaluation results | 3.8 | 4.1 | 4.4 | 4.6 | 4.2 | 3.7 | 2.3 | 2.5 |

Every average point of the evaluation results of the spaghetti noodles of Examples 6 to 11 was around 4. On the contrary, every average point of the evaluation results of the spaghetti noodles of Comparative Examples 4 and 5 was lower than 3.

Table 3 shows that, when the acute angle θ2 and the area proportion R1 of the center region 22 to the noodle configuration are set to 12° to 33° and 4% to 35%, respectively, a spaghetti noodle having good texture can be obtained, with the texture being well balanced between the outer regions 23 located outside the center region 22 and the center region 22.

Furthermore, grooved noodles were produced, with the depth T of the grooves with respect to the noodle diameter D being varied.

Example 12

Except that the depth T of the three grooves 11 with respect to the noodle diameter D was set to 15%, a dried spaghetti noodle was produced in the same manner as that of Example 4.

Example 13

Except that the depth T of the three grooves 11 with respect to the noodle diameter D was set to 20%, a dried spaghetti noodle was produced in the same manner as that of Example 4.

Example 14

Except that the depth T of the three grooves 11 with respect to the noodle diameter D was set to 35%, a dried spaghetti noodle was produced in the same manner as that of Example 4.

Example 15

Except that the depth T of the three grooves 11 with respect to the noodle diameter D was set to 60%, a dried spaghetti noodle was produced in the same manner as that of Example 4.

Example 16

Except that the depth T of the three grooves 11 with respect to the noodle diameter D was set to 70%, a dried spaghetti noodle was produced in the same manner as that of Example 4.

The spaghetti noodles produced in Examples 12 to 16 were evaluated for their texture based on the evaluation criteria shown in Table 1 by ten persons, and an average point of the evaluation results was obtained. The result thereof is shown in Table 4. It should be noted that Table 4 includes again the evaluation result of Example 4 where the depth T of the three grooves 11 with respect to the noodle diameter D was 50%.

TABLE 4

|  | Example 12 | Example 13 | Example 14 | Example 4 | Example 15 | Example 16 |
|---|---|---|---|---|---|---|
| Noodle diameter D (mm) | 2 | 2 | 2 | 2 | 2 | 2 |
| Number of grooves | 3 | 3 | 3 | 3 | 3 | 3 |
| Acute angle θ1 (°) | 25 | 25 | 25 | 25 | 25 | 25 |
| Area proportion R1 of center region 12 to noodle configuration (%) | 26.9 | 26.9 | 26.9 | 26.9 | 26.9 | 26.9 |
| Proportion R2 of noodle in center region 12 (%) | 91 | 91 | 91 | 90 | 91 | 91 |
| Depth T of three grooves with respect to noodle diamter D (%) | 15 | 20 | 35 | 50 | 60 | 70 |

TABLE 4-continued

|  | Example 12 | Example 13 | Example 14 | Example 4 | Example 15 | Example 16 |
|---|---|---|---|---|---|---|
| Average point of evaluation results | 3.0 | 3.7 | 3.9 | 4.2 | 3.7 | 3.1 |

While every spaghetti noodle produced in Examples 12 to 16 scored the average point of the evaluation results of at least 3, it can be presumed that, since the depth T of the three grooves 11 with respect to the noodle diameter D was varied, texture balance between the outer regions 13 located outside the center region 12 and the center region 12 changed, and the average point of the evaluation results also changed.

In addition, Examples 4 and 13 to 15 each scored the average point of the evaluation results of around 4, revealing that the depth T of the grooves 11 is preferably set to 20% to 60% in order to obtain a spaghetti noodle with even better texture.

REFERENCE SIGNS LIST 10, 20 grooved noodle, 11, 21 groove, 11a, 21a opening part, 11b, 21b innermost part, 11c, 21c side closer to center point, 11d, 21d first opening end part, 11e, 21e side farther from center point, 11f, 21f second opening end part, 11g, 21g middle point, 12, 22 center region, 13, 23 outer region, C1 first straight line, C2 second straight line, C3 third straight line, C4 fourth straight line, C5 fifth straight line, C6 sixth straight line, P center point, θ1, θ2 acute angle, D diameter, L direction, T depth, W thickness

The invention claimed is:

1. A grooved noodle formed with three grooves along a longitudinal direction of the noodle and having a substantially circular configuration in cross section,
   wherein the three grooves are arranged at intervals of 120° along a circumferential direction of the noodle and extend in a same rotational direction with respect to a center point in the cross section of the noodle,
   wherein each of the grooves includes a pair of sides opposing to each other and extending from an opening part of the groove toward an innermost part of the groove, a first opening end part located on one side of the pair of sides closer to the center point, and a second opening end part located on another side of the pair of sides further from the center point,
   wherein an acute angle formed between a straight line passing through the first opening end part and the innermost part and another straight line passing through the first opening end part and the center point in each of the grooves is 20° to 25°,
   wherein a center region defined in a triangle formed by three straight lines each passing through the innermost part and a middle point between the first opening end part and the second opening end part of a relevant groove has an area of 17% to 27% of a hypothetical area of a configuration when it is assumed that the three grooves are not provided, and
   wherein the noodle accounts for at least 85% of the center region.

2. The grooved noodle according to claim 1, wherein the three grooves each have a depth of 20% to 60% of a noodle diameter in cross section.

3. The grooved noodle according to claim 1, wherein a part of the noodle situated between adjacent grooves and having a smallest thickness has a thickness of 20% to 60% of a noodle diameter in cross section.

4. The grooved noodle according to claim 2, wherein a part of the noodle situated between adjacent grooves and having a smallest thickness has a thickness of 20% to 60% of a noodle diameter in cross section.

5. A grooved noodle formed with four grooves along a longitudinal direction of the noodle and having a substantially circular configuration in cross section,
   wherein the four grooves are arranged at intervals of 90° along a circumferential direction of the noodle and extend in a same rotational direction with respect to a center point in the cross section of the noodle,
   wherein each of the grooves includes a pair of sides opposing to each other and extending from an opening part of the groove toward an innermost part of the groove, a first opening end part located on one side of the pair of sides closer to the center point, and a second opening end part located on another side of the pair of sides further from the center point,
   wherein an acute angle formed between a straight line passing through the first opening end part and the innermost part and another straight line passing through the first opening end part and the center point in each of the grooves is 20° to 30°,
   wherein a center region defined in a quadrilateral formed by four straight lines each passing through the innermost part and a middle point between the first opening end part and the second opening end part of a relevant groove has an area of 13% to 30% of a hypothetical area of a configuration when it is assumed that the four grooves are not provided, and
   wherein the noodle accounts for at least 85% of the center region.

6. The grooved noodle according to claim 5, wherein the four grooves each have a depth of 20% to 60% of a noodle diameter in cross section.

7. The grooved noodle according to claim 5, wherein a part of the noodle situated between adjacent grooves and having a smallest thickness has a thickness of 20% to 60% of a noodle diameter in cross section.

8. The grooved noodle according to claim 6, wherein a part of the noodle situated between adjacent grooves and having a smallest thickness has a thickness of 20% to 60% of a noodle diameter in cross section.

* * * * *